United States Patent
Han et al.

(10) Patent No.: US 12,250,459 B2
(45) Date of Patent: Mar. 11, 2025

(54) CAMERA MODULE

(71) Applicant: SAMSUNG ELECTRO-MECHANICS CO., LTD., Suwon-si (KR)

(72) Inventors: Sang Hun Han, Suwon-si (KR); Nam Ki Park, Suwon-si (KR); Young Bok Yoon, Suwon-si (KR); Soo Cheol Lim, Suwon-si (KR); Byung Gi An, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 242 days.

(21) Appl. No.: 17/702,328

(22) Filed: Mar. 23, 2022

(65) Prior Publication Data

US 2022/0417406 A1 Dec. 29, 2022

(30) Foreign Application Priority Data

Jun. 24, 2021 (KR) .................. 10-2021-0082543

(51) Int. Cl.
*H04N 23/68* (2023.01)
*G02B 27/64* (2006.01)
(Continued)

(52) U.S. Cl.
CPC ......... *H04N 23/685* (2023.01); *G02B 27/646* (2013.01); *H02K 41/0354* (2013.01);
(Continued)

(58) Field of Classification Search
CPC ...... H04N 23/51; H04N 23/68; H04N 23/682; H04N 23/685; H04N 23/687;
(Continued)

(56) References Cited

U.S. PATENT DOCUMENTS

| 8,041,201 B2* | 10/2011 | Eromaki | G02B 7/102 |
| | | | 359/554 |
| 2012/0082442 A1* | 4/2012 | Kwon | H04N 23/55 |
| | | | 396/55 |

(Continued)

FOREIGN PATENT DOCUMENTS

| JP | 2019-95503 A | 6/2019 |
| KR | 10-2013-0072721 A | 7/2013 |

(Continued)

OTHER PUBLICATIONS

Korean Office Action Issued on Jan. 4, 2023, in Counterpart Korean Patent Application No. 10-2021-0082543 (7 Pages in English, 5 Pages in Korean).

*Primary Examiner* — Anthony J Daniels
(74) *Attorney, Agent, or Firm* — NSIP Law

(57) ABSTRACT

A camera module includes a housing, a lens module accommodated in the housing, a first optical image stabilization (OIS) driving unit configured to move the lens module, relative to the housing, in a first direction perpendicular to an optical axis direction, and a second OIS driving unit configured to move the lens module, relative to the housing, in a second direction perpendicular to the optical axis direction and intersecting the first direction, wherein the first OIS driving unit includes first voice coil motors disposed on both sides of the lens module in the first direction, and the second OIS driving unit includes second voice coil motors disposed on both sides of the lens module in the first direction.

20 Claims, 12 Drawing Sheets

(51) Int. Cl.
*H02K 41/035* (2006.01)
*H04N 23/51* (2023.01)
*H04N 23/54* (2023.01)
*H04N 23/55* (2023.01)

(52) U.S. Cl.
CPC ............ *H04N 23/51* (2023.01); *H04N 23/54* (2023.01); *H04N 23/55* (2023.01)

(58) Field of Classification Search
CPC .......... G02B 27/646; G03B 5/00; G03B 5/02; G03B 5/06; G03B 2205/00; G03B 2205/0007; G03B 2205/0015; G03B 2205/0069
USPC ...................................... 348/208.99
See application file for complete search history.

(56) References Cited

U.S. PATENT DOCUMENTS

| | | | |
|---|---|---|---|
| 2013/0163085 | A1 | 6/2013 | Lim et al. |
| 2017/0094187 | A1* | 3/2017 | Sharma .................... G03B 5/02 |
| 2017/0139225 | A1 | 5/2017 | Lim |
| 2017/0160558 | A1 | 6/2017 | Kim et al. |
| 2020/0153366 | A1* | 5/2020 | I ............................... H02P 6/006 |
| 2022/0091482 | A1* | 3/2022 | Mireault .................. G02B 7/08 |
| 2022/0272238 | A1* | 8/2022 | Jang ....................... H04N 23/57 |

FOREIGN PATENT DOCUMENTS

| | | |
|---|---|---|
| KR | 10-2016-0005956 A | 1/2016 |
| KR | 10-2017-0056387 A | 5/2017 |
| KR | 10-2020-0056320 A | 5/2020 |

\* cited by examiner

I-I'

CAMERA MODULE

CROSS-REFERENCE TO RELATED APPLICATIONS

This application claims the benefit under 35 USC 119(a) of Korean Patent Application No. 10-2021-0082543 filed on Jun. 24, 2021, in the Korean Intellectual Property Office, the entire disclosure of which is incorporated herein by reference for all purposes.

BACKGROUND

1. Field

The present disclosure relates to a camera module and an image stabilization function of a camera module.

2. Description of the Background

In recent years, an ultra-small camera module has been used in a mobile communications terminal such as a tablet personal computer (PC) or a laptop computer, as well as a mobile phone such as a smartphone. As mobile communications terminals become smaller, user hand-shake or device shake may significantly affect an image while the image is captured, thereby deteriorating quality of the image.

An image stabilization function may be implemented by moving a lens barrel, relative to an image sensor, in a direction perpendicular to an optical axis direction. An actuator moving the lens barrel may include a voice coil motor. The voice coil motor may include a coil and a magnet as components thereof, and electromagnetic force generated between the two components may cause relative movement therebetween. For example, the coil or the magnet may be mounted on a fixed member, and the other thereof may be mounted on a moving member. When current flows in the coil, the moving member may be moved relative to the fixed member in a specific direction.

Meanwhile, the greater the degree to which the lens barrel is moved, the greater the range in which image stabilization is necessary. Therefore, it may be advantageous to increase a range in which the actuator is moved for image stabilization. However, the greater the distance in which the voice coil motor is moved, the greater the distance between the coil and the magnet. Therefore, electromagnetic force between the two may also be weakened, and it may thus be difficult to secure sufficient driving force for image stabilization.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, a lens barrel accommodated in the housing, a first optical image stabilization (OIS) driving unit configured to move the lens barrel, relative to the housing, in a first direction perpendicular to an optical axis direction, and a second OIS driving unit configured to move the lens barrel, relative to the housing, in a second direction perpendicular to the optical axis direction and intersecting the first direction, wherein the first OIS driving unit includes first voice coil motors disposed on both sides of the lens barrel in the first direction, and the second OIS driving unit includes second voice coil motors disposed on both sides of the lens barrel in the first direction.

The first voice coil motor may include a first magnet fixedly disposed on the lens module, and a first coil disposed in the housing and facing the first magnet in the first direction, and the second voice coil motor may include a second magnet fixedly disposed on the lens module, and a second coil disposed in the housing and facing the second magnet in the first direction.

Each of the first magnet and the second magnet may be a portion of a single magnet.

A surface of the first magnet, facing the first coil may have a single polarity, and a surface of the second magnet, facing the second coil may be polarized in the second direction.

The second coil may include two coils arranged in the second direction.

The first OIS driving unit may further include a third voice coil motor disposed on one side of the lens module in the second direction, and the second OIS driving unit may further include a fourth voice coil motor disposed on one side of the lens module in the second direction.

The third voice coil motor may include a third magnet fixedly disposed on the lens module, and a third coil disposed in the housing and facing the third magnet in the second direction, and the fourth voice coil motor may include a fourth magnet fixedly disposed on the lens module, and a fourth coil disposed in the housing and facing the fourth magnet in the second direction.

Each of the third magnet and the fourth magnet may be a portion of a single magnet.

A surface of the third magnet, facing the third coil may be polarized in the first direction, and a surface of the fourth magnet, facing the fourth coil may have a single polarity.

The third coil may include two coils arranged in the first direction.

The camera module may further include a third OIS driving unit configured to move the lens module, relative to the housing in a third direction parallel to the optical axis direction, wherein the third OIS driving unit may include a voice coil motor including a fifth magnet and a fifth coil facing each other in the second direction.

The camera module may further include a carrier accommodating the lens module and disposed in the housing to be moved in the third direction, wherein the fifth magnet may be fixedly disposed in the carrier, and the fifth coil may be fixedly disposed in the housing.

In another general aspect, a camera module includes a housing, a lens module accommodated in the housing, a first optical image stabilization (OIS) driving unit configured to move the lens module, relative to the housing, in a first direction perpendicular to an optical axis direction, wherein the first OIS driving unit includes a first voice coil motor disposed on one side of the lens module in the first direction, and a second voice coil motor disposed on one side of the lens module in a second direction perpendicular to the first direction.

The first voice coil motor may include a first magnet fixedly disposed on the lens module, and a first coil disposed in the housing and facing the first magnet in the first direction, and the second voice coil motor may include a second magnet fixedly disposed on the lens module, and a second coil disposed in the housing and facing the second magnet in the second direction.

The first coil or the second coil may include two coils arranged in the first direction.

The first magnet or the second magnet may be polarized in the first direction.

In another general aspect, a camera module includes a lens barrel movable in a first direction perpendicular to an optical axis and a second direction perpendicular to the optical axis direction and intersecting the first direction, first direction driving units disposed at opposite sides of the lens barrel in the first direction configured to urge the lens barrel in the first direction, second direction driving units disposed at the opposite sides of the lens barrel in the first direction configured to urge the lens barrel in the second direction.

The first and second direction driving units may include voice coil motors for optical image stabilization (OIS).

The first direction driving units may include first magnets fixedly disposed on the opposite sides of the lens module, and first coils disposed facing the first magnets in the first direction, and the second direction driving units may include second magnets fixedly disposed on the opposite sides of the lens module, and second coils disposed facing the second magnets in the first direction.

The first magnets and the second magnets may be disposed in the second direction on each opposite side of the lens module, and the first coils and the second coils may be disposed in the second direction opposing each opposite side of the lens module to face the first magnets and the second magnets, respectively.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
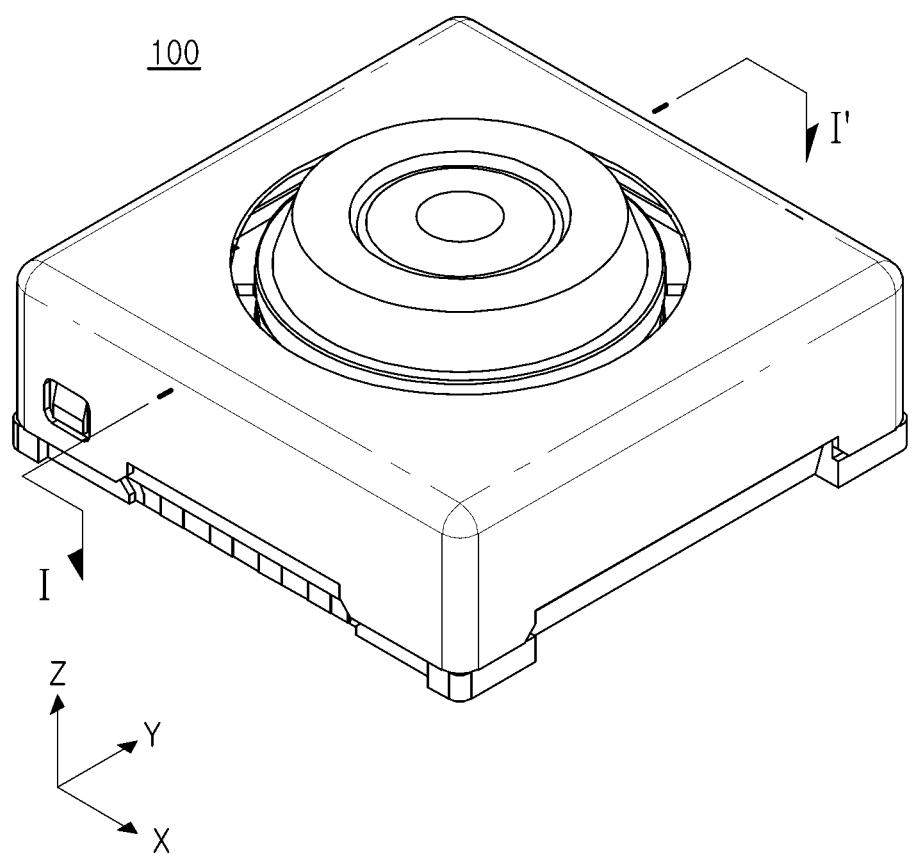
FIG. 1 is a perspective view of a camera module according to one or more example embodiments.

Hereinafter, while example embodiments of the present disclosure will now be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a camera module having an improved image stabilization function, and more particularly, an actuator having a sufficient driving force even when the lens barrel is moved to a greater degree for image stabilization.

The present disclosure relates to a lens driving device and a camera module including the same, and may be used in a portable electronic device such as a mobile communications terminal, a smart phone, and a tablet personal computer (PC).

The camera module is an optical device for capturing an image or a video, and may include a lens refracting light reflected from a subject and the lens driving device moving the lens to adjust a focus or stabilize the image.

Figure 2:
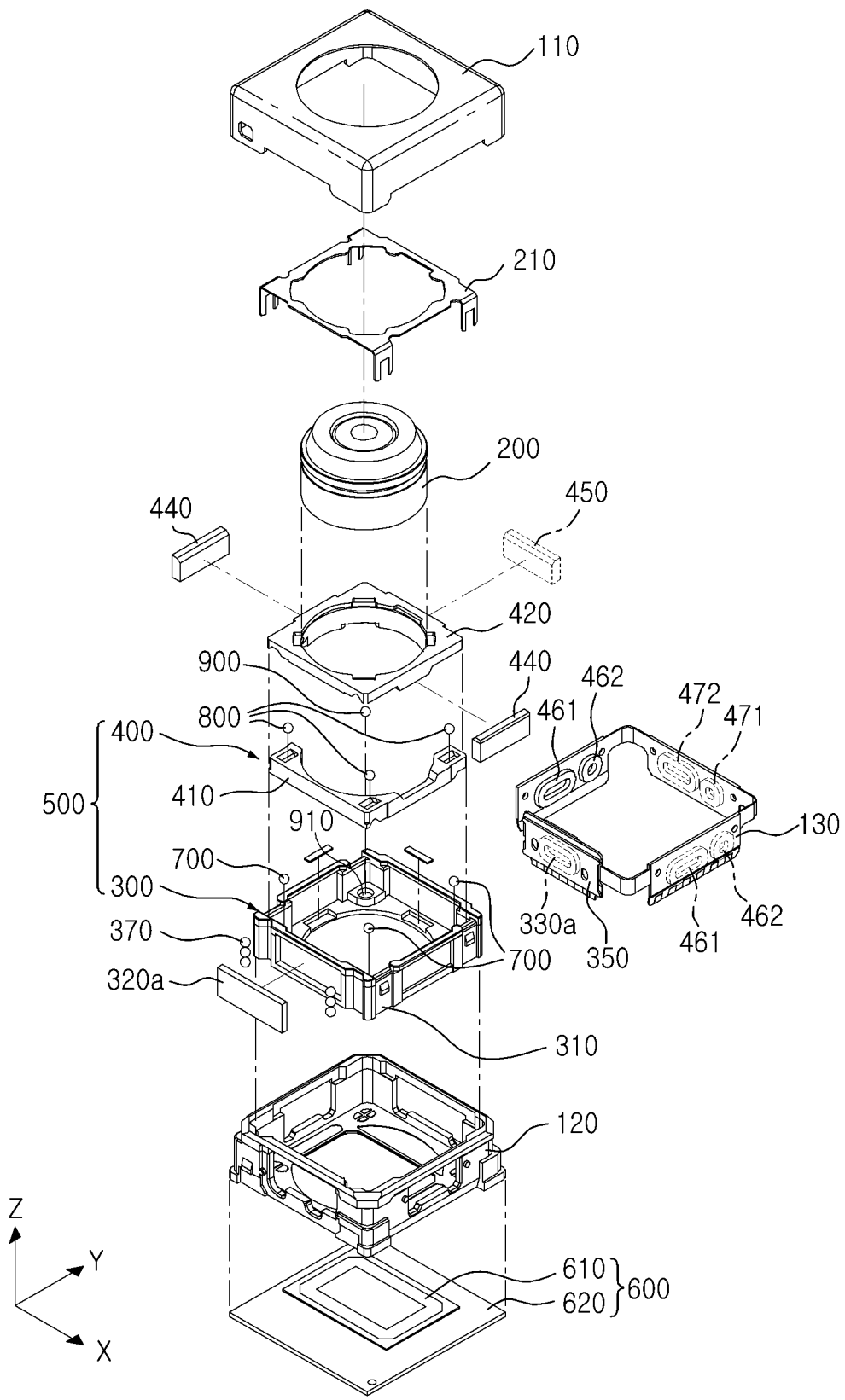
FIG. 2 is an exploded perspective view of the camera module according to one or more example embodiments.

FIG. 1 is a perspective view of a camera module according to one or more example embodiments; and FIG. 2 is an exploded perspective view of the camera module according to one or more example embodiments.

Referring to FIGS. 1 and 2, a camera module 100 according to one or more example embodiments of the present disclosure includes a lens barrel 200, an image sensor unit 600 that converts light incident through the lens barrel 200 into an electrical signal, a housing 120 accommodating the lens barrel 200 and the lens driving device 500 and a case 110.

The lens barrel 200 may have a hollow cylindrical shape to accommodate a plurality of lenses for imaging a subject, and the plurality of lenses may be mounted in the lens barrel 200 in an optical axis direction. The optical axis direction is parallel to a Z-axis direction, and in the present disclosure, the optical axis direction or a direction parallel to the optical axis direction indicates the Z-axis direction. The number of the plurality of lenses mounted in the lens barrel 200 may depend on a design of the lens barrel 200, and each lens may have an optical characteristic such as the same or different refractive index.

The image sensor unit 600 is a device that converts the light incident through the lens barrel 200 into the electrical signal. For example, the image sensor unit 600 may include an image sensor 610 and a printed circuit board 620 on which the image sensor 610 is mounted, and may further include an infrared filter. The infrared filter may serve to cut off light in an infrared region in the light incident thereto through the lens barrel 200.

The image sensor 610 may convert the light incident through the lens barrel 200 into the electrical signal. For example, the image sensor 610 may be a charge coupled device (CCD) or a complementary metal-oxide semiconductor (CMOS).

The electrical signal converted by the image sensor 610 may be output through a display of a portable electronic device. The image sensor 610 may be mounted on the printed circuit board 620, and electrically connected to the printed circuit board 620 by wire bonding, for example.

In an example embodiment, the camera module may include the lens driving device 500. The lens driving device 500 may be configured to move the lens barrel 200, relative to the housing 120. The lens driving device 500 may include an autofocus driver 300 for autofocus and an image stabilization driver 400 for image stabilization. For example, the lens driving device 500 may adjust the focus by moving the lens barrel 200 in the optical axis (Z-axis) direction, and may stabilize an image being captured by moving the lens barrel 200 in the direction perpendicular to the optical axis (Z-axis) direction.

The case 110 may be coupled to the housing 120 to cover an outer surface of the housing 120, and function to protect an internal component of the camera module. In addition, the case 110 may serve to shield electromagnetic waves. For example, the case 110 may shield the electromagnetic waves generated from the camera module to prevent the electromagnetic waves from affecting another electronic component in the portable electronic device.

In addition, various electronic components as well as the camera module may be mounted in the portable electronic device, and the case 110 may thus shield the electromagnetic waves generated from these electronic components to prevent the electromagnetic waves from affecting the camera module. The case 110 may be made of a metal and thus be grounded to a ground pad disposed in the printed circuit board 620, resulting in shielding the electromagnetic waves.

The autofocus driver 300 may be configured to move the lens barrel 200 in the direction parallel to the optical axis direction. In another example embodiment, the autofocus driver 300 may include a carrier 310 that accommodates the lens barrel 200 and an autofocus (AF) actuator that generates a driving force to move the lens barrel 200 and the carrier 310 in the optical axis (Z-axis) direction.

In an example embodiment, the AF actuator may be a voice coil motor, and may include a magnet 320a and a coil 330a. The magnet 320a may be mounted on the carrier 310, and the coil 330a may be mounted in the housing 120. The coil 330a may be mounted in the housing 120 through a substrate 130.

The magnet 320a may be a moving member that is fixedly mounted on the carrier 310 and moved in the optical axis (Z-axis) direction together with the carrier 310, and the coil 330a may be a fixed member fixed to the housing 120. However, the present disclosure is not limited thereto, and positions of the magnet 320a and the coil 330a may also be switched to each other.

When power is applied to the coil 330a, the carrier 310 may be moved in the optical axis (Z-axis) direction by an electromagnetic force between the magnet 320a and the coil 330a. The lens barrel 200 may be accommodated in the carrier 310, and the lens barrel 200 may also be moved in the optical axis (Z-axis) direction by the movement of the carrier 310.

A rolling member 370 may be disposed between the carrier 310 and the housing 120 to reduce friction between the carrier 310 and the housing 120 when the carrier 310 is moved. The rolling member 370 may have a ball shape. The rolling member 370 may be disposed in each of two sides (i.e., +X direction and −X direction) in a longitudinal direction (i.e., X direction) of the magnet 320*a*.

A first yoke 350 may be disposed in the housing 120, and the first yoke 350 may generate an attractive force between the magnet 320*a* and the first yoke 350 in the direction perpendicular to the optical axis (Z-axis) direction. For example, the rolling member 370 may keep in contact with the carrier 310 and the housing 120 by the magnetic attraction between the first yoke 350 and the magnet 320*a*.

The autofocus driver 300 shown in FIG. 2 is only an example, and example embodiments of the present disclosure are not limited thereto. It is sufficient that the autofocus driver 300 is configured to move the lens barrel 200, relative to the image sensor 610 in the optical axis direction. For example, some components may be omitted from the autofocus driver 300 shown in FIG. 2, or additional components may be added to the autofocus driver 300 shown in FIG. 2.

The image stabilization driver 400 may be used to stabilize a blurred image or an unstable video, due to a factor such as user hand-shake when capturing the image or the video. For example, when the image being captured is unstable due to user hand-shake or the like, the image stabilization driver 400 may stabilize the image by allowing the lens barrel 200 to be relatively displaced to correspond to this instability. For example, the image stabilization driver 400 may stabilize the image by moving the lens barrel 200 in the direction perpendicular to the optical axis (Z-axis) direction.

The image stabilization driver 400 may include a guide member guiding the movement of the lens barrel 200 and an image stabilization driver generating a driving force to move the guide member in the direction perpendicular to the optical axis (Z-axis) direction.

In an example embodiment, the guide member may include a frame 410 and a lens holder 420. The frame 410 and the lens holder 420 may be inserted into the carrier 310, disposed in the optical axis (Z-axis) direction, and may serve to guide movement of the lens barrel 200. In an example embodiment, the frame 410 and the lens holder 420 may be moved in the carrier 310 in the direction perpendicular to the optical axis (Z-axis) direction.

The lens barrel 200 may be fixedly coupled to the lens holder 420, and in the present disclosure, the lens barrel 200 and the lens holder 420 may be referred to as a lens module.

The image stabilization driver 400 (optical image stabilization (OIS) driver) may be configured to move the lens barrel 200 in a two-dimensional plane perpendicular to the optical axis direction. In an example embodiment, the image stabilization driver 400 may move the lens barrel 200 in the two directions each perpendicular to the optical axis direction and intersecting each other. For example, the image stabilization driver 400 may move the lens barrel in the X-axis and Y-axis directions, perpendicular to the optical axis (Z-axis) direction.

In an example embodiment, the image stabilization driver 400 may include a first optical image stabilization (OIS) driver moving the lens barrel in a first direction, and a second OIS driver moving the lens barrel in a second direction. The first image stabilization driver may generate a driving force in the first direction (i.e., X direction) perpendicular to the optical axis (Z-axis) direction, and the second image stabilization driver may generate a driving force in the second direction (i.e., Y direction) perpendicular to the first direction.

The first and second image stabilization drivers may include a voice coil motor as an actuator. The voice coil motor may include a magnet mounted on the lens holder 420, and a coil mounted in the housing. The coil may be mounted in the housing 120 through the substrate 130. The magnet may be a moving member moved in the direction perpendicular to the optical axis (Z-axis) direction along with the lens holder 420, and the coil may be a fixed member fixed to the housing 120. However, the present disclosure is not limited thereto, and it is also possible to switch the positions of the magnet and the coil. When current is applied to the coil, the lens holder 420 may be moved relative to the housing 120 by an electromagnetic force between the coil and the magnet.

In an example embodiment, the camera module may include ball members that allow the OIS driver to be smoothly moved. The ball members may support the frame 410 and the lens holder 420 during a process of stabilizing the image, and may function to guide a direction in which the frame 410 and the lens holder 420 are moved. The ball members may also maintain each distance between the carrier 310, frame 410 and lens holder 420.

In an example embodiment, the ball members may include a first ball member 700 and a second ball member 800. The first ball member 700 may guide the movement of the image stabilization driver 400 in the first direction (X direction), and the second ball member 800 may guide the movement of the image stabilization driver 400 in the second direction (Y direction).

In an example embodiment, a first guide groove accommodating the first ball member 700 may be disposed in a surface where the carrier 310 and the frame 410 face each other in the optical axis (Z-axis) direction. In an example embodiment, the first guide groove may extend in the X direction, and may limit a movement direction of the first ball member to the X direction.

In an example embodiment, a second guide groove accommodating the second ball member 800 may be disposed in a surface where the frame 410 and the lens holder 420 face each other in the optical axis (Z-axis) direction. In an example embodiment, the second guide groove may extend in the Y direction, and may limit a movement direction of the second ball member to the Y direction.

In an example embodiment, the number of the first guide grooves (or the second guide grooves) may depend on the number of the first ball members (or the second ball members). These several guide grooves may respectively have cross-sections of the same or different shapes. For example, the first guide groove disposed in the carrier and the first guide groove disposed in the frame may respectively have the cross-sections of the same or different shapes. For example, the second guide groove disposed in the frame and the second guide groove disposed in the lens holder may respectively have the cross-sections of the same or different shapes. For example, some of the guide grooves may each have a cross-section of a substantially U-shape, and other portions of the guide grooves may each have a cross-section of a substantially V-shape.

In an example embodiment, a third ball member 900 may be positioned to support the movement of the lens holder 420 between the carrier 310 and the lens holder 420. The third ball member 900 may support both the movements of the lens holder 420 in the first direction (X direction) and the second direction (Y direction).

A third guide groove accommodating the third ball member 900 may be disposed in a surface where the carrier 310 and the lens holder 420 face each other in the optical axis (Z-axis) direction. The third ball member 900 may be accommodated in the third guide groove and inserted between the carrier 310 and the lens holder 420.

The third ball member 900 accommodated in the third guide groove may have limited movement in the optical axis (Z-axis) direction, and may roll in the first direction (X direction) and the second direction (Y direction). For example, the third guide groove 910 may be defined as a circular bottom surface and a cylindrical sidewall extending from the bottom surface.

A structure shown in FIG. 2 for guiding the lens holder 420 to be moved in the direction perpendicular to the optical axis direction is only an example. It is sufficient that the image stabilization driver 400 is configured to move the lens barrel 200, relative to the image sensor 610 in the direction perpendicular to the optical axis direction. For example, some components may be omitted from the image stabilization driver 400 shown in FIG. 2, or additional components may be added to the image stabilization driver 400 shown in FIG. 2.

Figure 3:
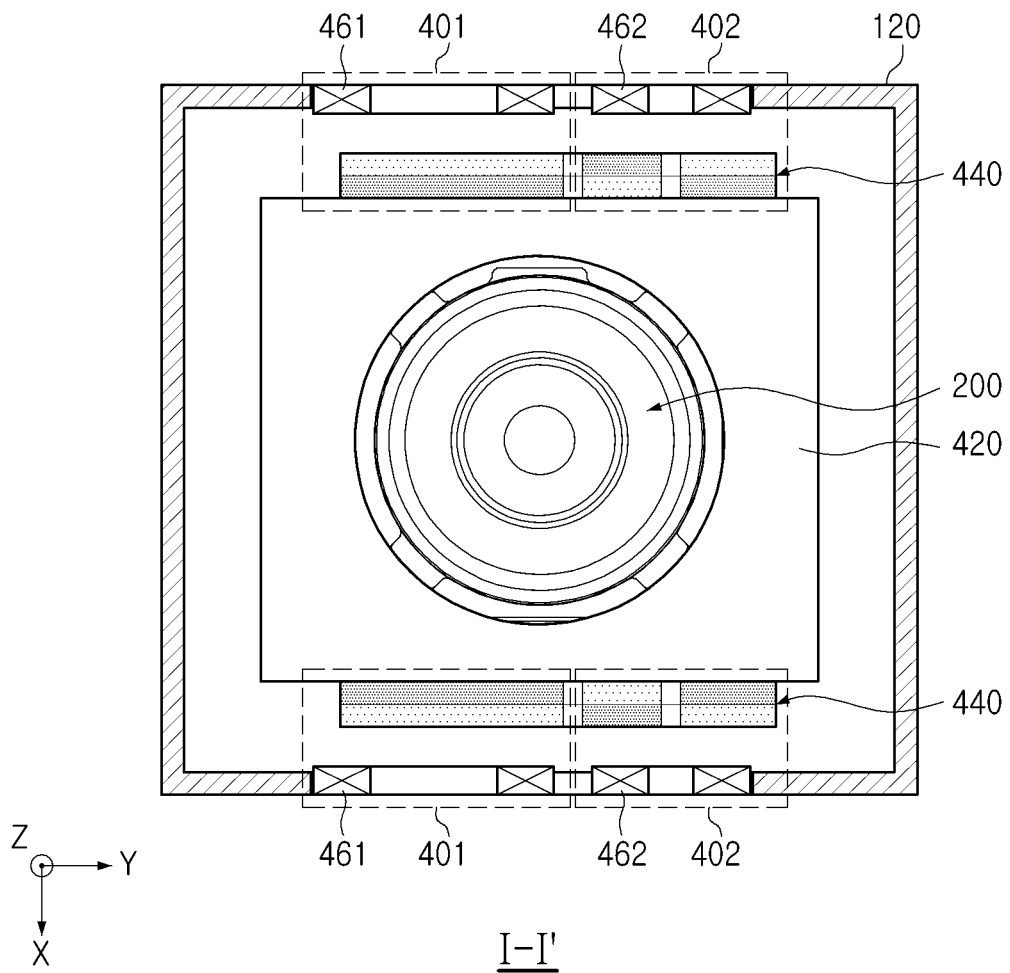
FIG. 3 shows an actuator for image stabilization in one or more example embodiments.
Figure 4:
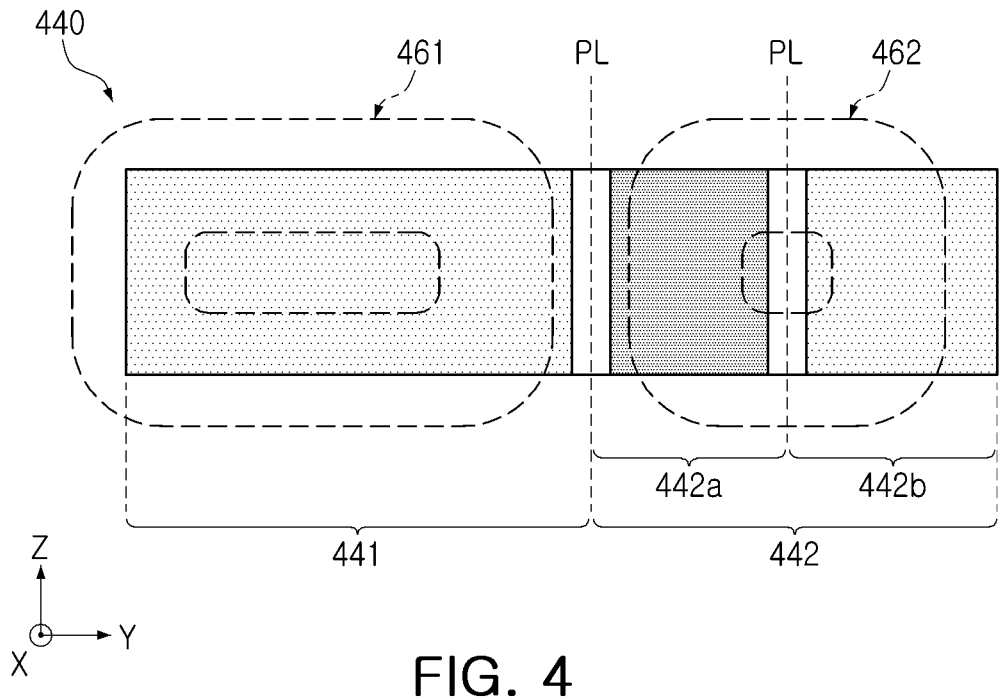
FIG. 4 is a side view of the actuator of FIG. 3.

FIG. 3 shows an actuator for image stabilization in one or more example embodiments; FIG. 4 is a side view of the actuator of FIG. 3; and FIG. 5 is a side view of the actuator of FIG. 3, in which a magnet is in a different form.

Figure 5:
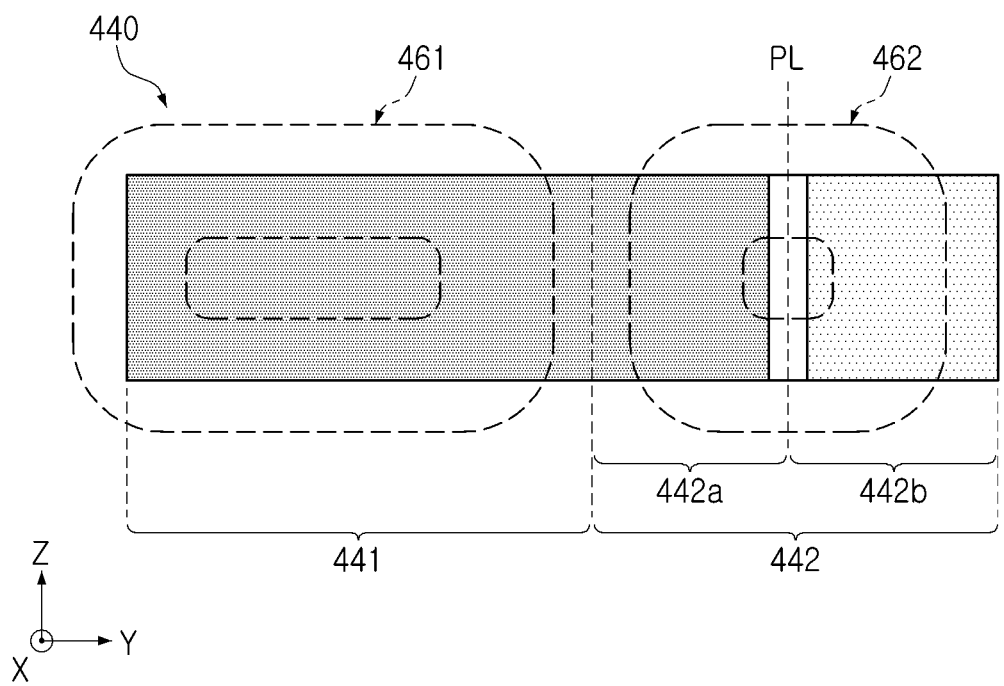
FIG. 5 is a side view of the actuator of FIG. 3, in which a magnet is in a different form.

Referring to FIGS. 3 through 5, in an example embodiment, the first OIS driving unit may include first voice coil motors 401 positioned as a pair on both sides of the lens barrel 200. The first OIS driving unit may be configured to move the lens barrel 200, relative to the housing 120 in the first direction, and in an example embodiment, the first voice coil motors 401 may be disposed as the pair on both the sides of the lens barrel 200 in the first direction. For example, the first voice coil motors 401 may respectively be disposed at the lens barrel 200 in the −X direction and +X direction.

In an example embodiment, the first voice coil motor 401 may include a first magnet 441 fixedly disposed on the lens barrel 200, and a first coil 461 disposed in the housing 120 and facing the first magnet 441 in the first direction. For example, the first magnet 441 may be mounted on the lens holder 420, and the lens barrel 200 accommodated in the lens holder 420 by electromagnetic interaction between the first coil 461 and the first magnet 441 may be moved relative to the housing 120 in the first direction.

In an example embodiment, the second OIS driving unit may include second voice coil motors 402 positioned as a pair on both the sides of the lens barrel 200. The second OIS driving unit may be configured to move the lens barrel 200, relative to the housing 120 in the second direction, and in an example embodiment, the second voice coil motors 402 may be disposed as the pair on both the sides of the lens barrel 200 in a direction perpendicular to the second direction. For example, the second voice coil motors 402 may respectively be disposed at the lens barrel 200 in the −X direction and +X direction.

In an example embodiment, the second voice coil motors 402 may respectively be disposed next to the first voice coil motors 401. For example, a second magnet 442 and a second coil 462 may respectively be disposed adjacent to the first magnet 441 and the first coil 461 in the Y direction. For example, the first coil 461 and the second coil 462 may be arranged in the second direction, and the first magnet 441 and the second magnet 442 may be arranged in the second direction.

In an example embodiment, the second voice coil motor 402 may include the second magnet 442 fixedly disposed on the lens barrel 200, and the second coil 462 disposed in the housing 120 and facing the second magnet 442 in the first direction. For example, the second magnet 442 may be mounted on the lens holder 420, and the lens barrel 200 accommodated in the lens holder 420 by electromagnetic interaction between the second coil 462 and the second magnet 442 may be moved relative to the housing 120 in the second direction.

In an example embodiment, each of the first magnet 441 and the second magnet 442 partially configuring the first voice coil motor 401 and the second voice coil motor 402 may be a portion of a single magnet 440. For example, the single magnet 440 may be disposed on one side of the lens barrel 200, and the single magnet 440 may face both of the first coil 461 and the second coil 462 in the first direction. Here, a portion of the magnet 440, facing the first coil 461 may be referred to as the first magnet 441, and a portion of the magnet 440, facing the second coil 462 may be referred to as the second magnet 442.

The drawings of the present disclosure show that the first magnet 441 and the second magnet 442 are included in the single magnet 440. However, the example embodiments of the present disclosure are not limited thereto, and in other example embodiments, the first magnet 441 and the second magnet 442 may be individual magnets separated from each other.

In the present disclosure, two components facing each other in a specific direction may indicate that the two components are disposed to partially or entirely overlap each other when viewed in the specific direction. For example, the first coil 461 facing the first magnet 441 in the first direction may indicate that the first coil 461 and the first magnet 441 at least partially overlap each other when viewed in the first direction.

In an example embodiment, the first magnet 441 may have a single polarity. For example, a surface of the first magnet 441, facing the first coil 461 may have either an N pole or an S pole.

In an example embodiment, the second magnet 442 may be polarized at least once in its longitudinal direction (Y direction). For example, a surface of the second magnet 442, facing the second coil 462 may have a different polarity, based on a polarization boundary (PL). Referring to FIG. 4, the second magnet 442 may be divided into two portions 442a and 442b left and right, based on the polarization boundary PL, and the left portion 442a and right portion 442b of the second magnet 442 may respectively face the left portion and right portion of the first coil 461.

In an example embodiment, the first magnet 441 may be disposed adjacent to the second magnet 442, or may be formed integrally with the second magnet 442. In an example embodiment, the first magnet 441 may be adjacent to or border the left portion 442a of the second magnet 442. Here, the left portion 442a of the second magnet 442 and the first magnet 441 may have the same or different polarities. Referring to FIG. 4, the first magnet 441 may have the different polarity from that of the left portion 442a of the second magnet 442.

The magnet 440 of FIG. 3 may have a type shown in FIG. 4, and this type is only an example, and the magnet 440 may have a type shown in FIG. 5. Referring to FIG. 5, the first magnet 441 may have the same polarity as that of the left portion 442*a* of the second magnet 442.

Figure 6:
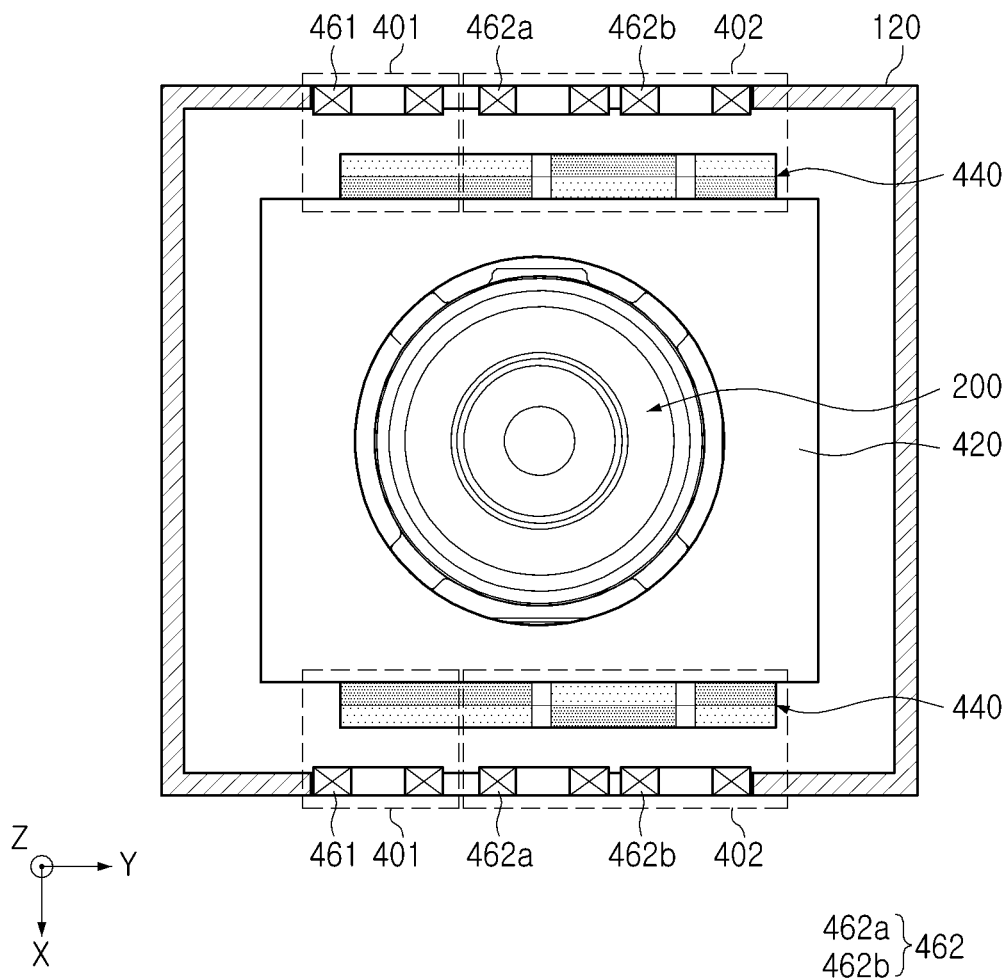
FIG. 6 shows an actuator for image stabilization in one or more other example embodiments.
Figure 7:
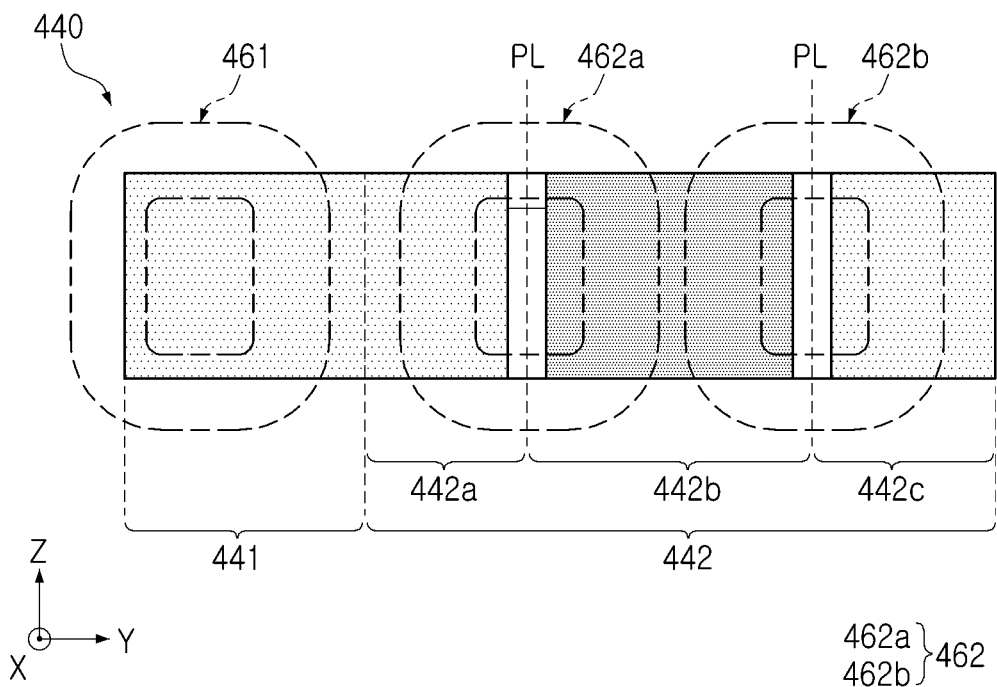
FIG. 7 is a side view of the actuator of FIG. 6.

FIG. 6 shows an actuator for image stabilization in one or more other example embodiments; FIG. 7 is a side view of the actuator of FIG. 6; and FIG. 8 is a side view of the actuator of FIG. 6, in which the magnet is in a different form.

Figure 8:
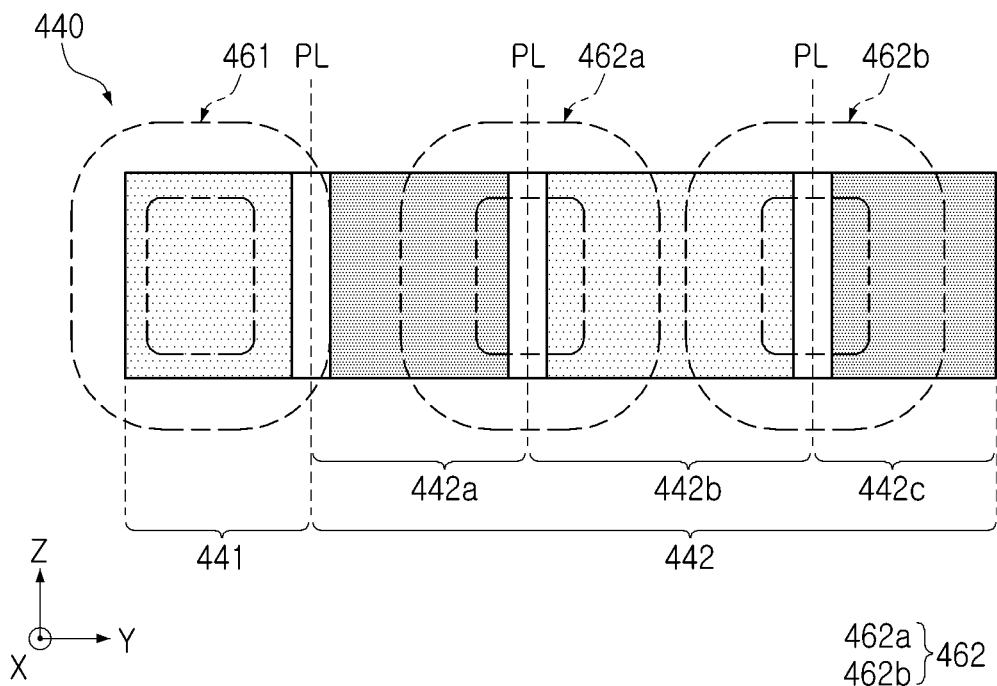
FIG. 8 is a side view of the actuator of FIG. 6, in which a magnet is in a different form.

Referring to FIGS. 6 through 8, in an example embodiment, the second coil 462 may include two coils 462*a* and 462*b*. The second coil 462 may be disposed in a direction parallel to a direction of a driving force generated by the second voice coil motor 402. For example, the second voice coil motor 402 may move the lens barrel 200 in the second direction, and the second coil 462 may include the two coils 462*a* and 462*b* arranged in the second direction.

In an example embodiment, the second magnet 442 may be polarized twice in the second direction to be divided into three portions 442*a*, 442*b* and 442*c*. For example, the second magnet 442 may include two polarization boundaries (PL). The polarization boundary (PL) may extend in the direction parallel to the optical axis (i.e., Z-axis) direction. The magnet may have different polarities, based on the polarization boundary (PL). For example, the first portion 442*a* and the third portion 442*c* may each have the N pole, and the second portion 442*b* may have the S pole.

In an example embodiment, the first magnet 441 may be disposed adjacent to the second magnet 442, or may be formed integrally with the second magnet 442. In an example embodiment, the first magnet 441 may be adjacent to or border the left portion (first portion) 442*a* of the second magnet 442. Here, the left portion 442*a* of the second magnet 442 and the first magnet 441 may have the same or different polarities. Referring to FIG. 7, the first magnet 441 may have the same polarity as that of the left portion 442*a* of the second magnet 442.

The magnet 440 of FIG. 6 may have a type shown in FIG. 7, and this type is only an example, and the magnet 440 may have a type shown in FIG. 8. Referring to FIG. 8, the first magnet 441 may have the different polarity from that of the left portion 442*a* of the second magnet 442.

Figure 9:
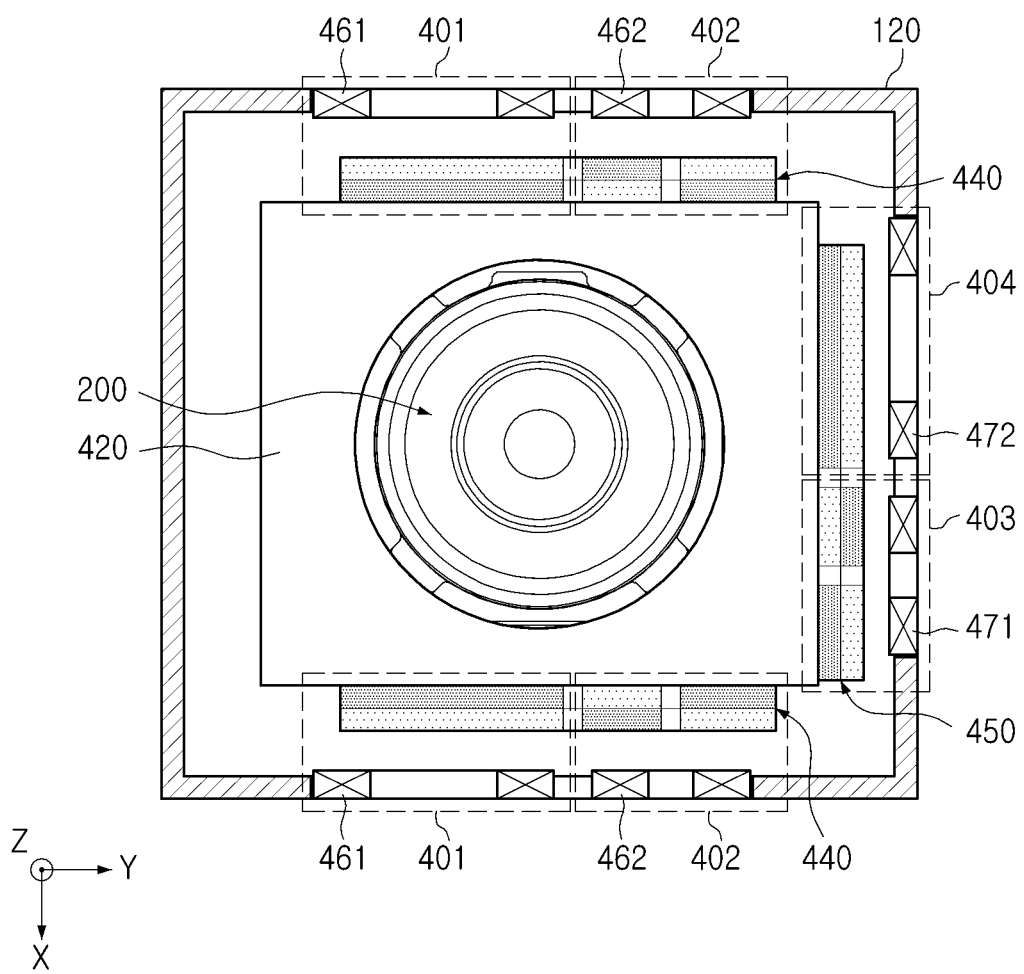
FIG. 9 shows an actuator for image stabilization in one or more yet other example embodiments.
Figure 10:
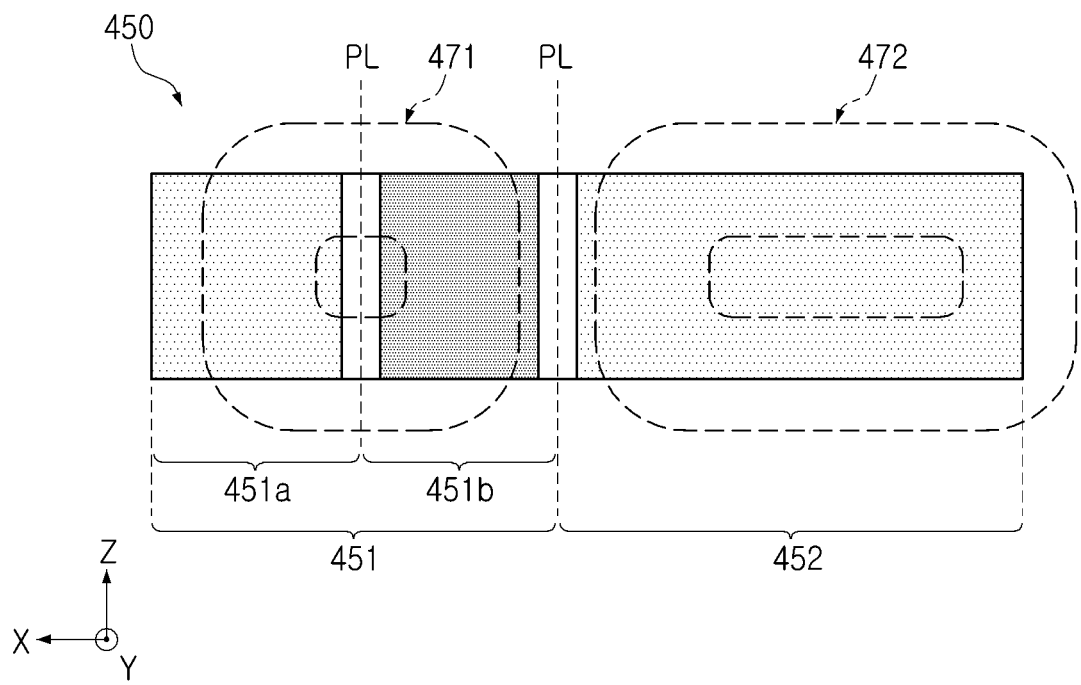
FIG. 10 is a side view of the actuator of FIG. 9.

FIG. 9 shows an actuator for image stabilization in one or more yet other example embodiments; FIG. 10 is a side view of the actuator of FIG. 9; and FIG. 11 is a side view of the actuator of FIG. 9, in which a magnet is in a different form.

Figure 11:
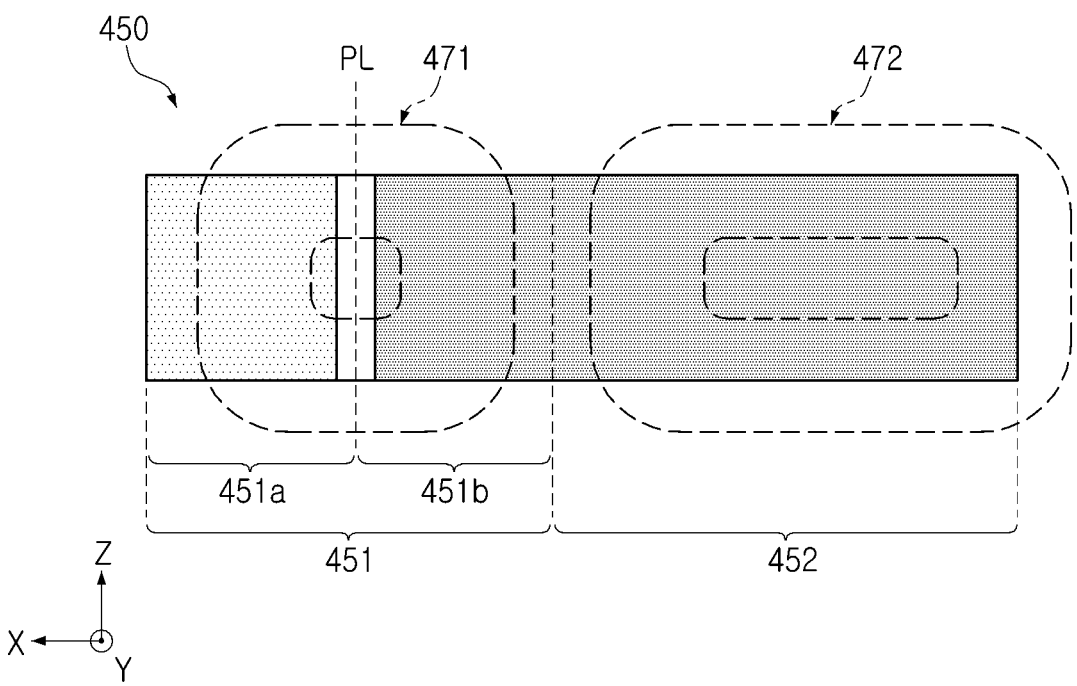
FIG. 11 is a side view of the actuator of FIG. 9, in which a magnet is in a different form.

Referring to FIGS. 9 through 11, in an example embodiment, the first OIS driving unit may further include a third voice coil motor 403 in addition to the first voice coil motor 401. Like the first voice coil motor 401, the third voice coil motor 403 may be configured to move the lens barrel 200, relative to the housing 120 in the first direction (X direction).

In an example embodiment, the third voice coil motor 403 may include a third magnet 451 fixedly disposed on the lens barrel 200, and a third coil 471 disposed in the housing 120 and facing the third magnet 451 in the second direction. For example, the third magnet 451 may be mounted on the lens holder 420, and the lens barrel 200 accommodated in the lens holder 420 by electromagnetic interaction between the third coil 471 and the third magnet 451 may be moved relative to the housing 120 in the first direction.

The first voice coil motor 401 and the third voice coil motor 403 may be disposed in the lens barrel 200 in directions different from each other. In an example embodiment, the first voice coil motor 401 may be disposed on the lens barrel 200 in the first direction (e.g., +X/−X direction), and the third voice coil motor 403 may be disposed on the lens barrel 200 in the second direction (e.g., +Y direction). For example, the first magnet 441 may be mounted on a surface of the lens holder 420, facing the first direction, and the third magnet 451 may be mounted on a surface of the lens holder 420, facing the second direction.

In an example embodiment, the second OIS driving unit may further include a fourth voice coil motor 404 in addition to the second voice coil motor 402. Like the second voice coil motor 402, the fourth voice coil motor 404 may be configured to move the lens barrel 200, relative to the housing 120 in the second direction (Y direction).

In an example embodiment, the fourth voice coil motor 404 may include a fourth magnet 452 fixedly disposed on the lens barrel 200, and a fourth coil 472 disposed in the housing 120 and facing the fourth magnet 452 in the second direction. For example, the fourth magnet 452 may be mounted on the lens holder 420, and the lens barrel 200 accommodated in the lens holder 420 by electromagnetic interaction between the fourth coil 472 and the fourth magnet 452 may be moved relative to the housing 120 in the second direction.

The second voice coil motor 402 and the fourth voice coil motor 404 may be disposed on the lens barrel 200 in directions different from each other. The second voice coil motor 402 may be disposed on the lens barrel 200 in the first direction (e.g., +X/−X direction), and the fourth voice coil motor 404 may be disposed on the lens barrel 200 in the second direction (e.g., +Y direction). For example, the second magnet 442 may be mounted on the outer surface of the lens holder 420, facing the first direction, and the fourth magnet 452 may be mounted on the outer surface of the lens holder 420, facing the second direction.

In an example embodiment, each of the third magnet 451 and the fourth magnet 452 partially configuring the third voice coil motor 403 and the fourth voice coil motor 404 may be a portion of a single magnet 450. For example, the single magnet 450 may be disposed on one side of the lens barrel 200, and the single magnet 450 may face both of the third coil 471 and the fourth coil 472 in the second direction. Here, a portion of the magnet 450, facing the third coil 471 may be referred to as the third magnet 451, and a portion of the magnet 450, facing the fourth coil 472 may be referred to as the fourth magnet 452.

The drawings of the present disclosure show that the third magnet 451 and the fourth magnet 452 are included in the single magnet 450. However, the example embodiments of the present disclosure are not limited thereto, and in another example embodiment, the third magnet 451 and the fourth magnet 452 may be individual magnets separated from each other.

In an example embodiment, the fourth magnet 452 may have a single polarity. For example, a surface of the fourth magnet 452, facing the fourth coil 472 may have either the N pole or the S pole.

In an example embodiment, the third magnet 451 may be polarized at least once in its longitudinal direction (X direction). For example, a surface of the third magnet 451, facing the third coil 471 may have a different polarity, based on a polarization boundary (PL). Referring to FIG. 10, the third magnet 451 may be divided into two portions 451*a* and 451*b* left and right, based on the polarization boundary PL, and the left portion 451*a* and right portion 451*b* of the third magnet 451 may respectively face the left portion and right portion of the third coil 471.

In an example embodiment, the third magnet 451 may be disposed adjacent to the fourth magnet 452, or may be formed integrally with the fourth magnet 452. In an example embodiment, the fourth magnet 452 may be adjacent to or border the right portion 451*b* of the third magnet 451. Here, the right portion 451*b* of the third magnet 451 and the fourth magnet 452 may have the same or different polarities.

Referring to FIG. 10, the fourth magnet 452 may have the different polarity from that of the right portion 451b of the third magnet 451.

The magnet 450 of FIG. 9 may have a type shown in FIG. 10, and this type is only an example, and the magnet 450 may have a type shown in FIG. 11. Referring to FIG. 11, the fourth magnet 452 may have the same polarity as that of the right portion 451b of the third magnet 451.

FIG. 9 shows that the third voice coil motor 403 and the fourth voice coil motor 404 are both disposed on the right side of the lens holder 420, and this disposition is only an example, and in another example embodiment, one of the two components may be omitted.

Figure 12:
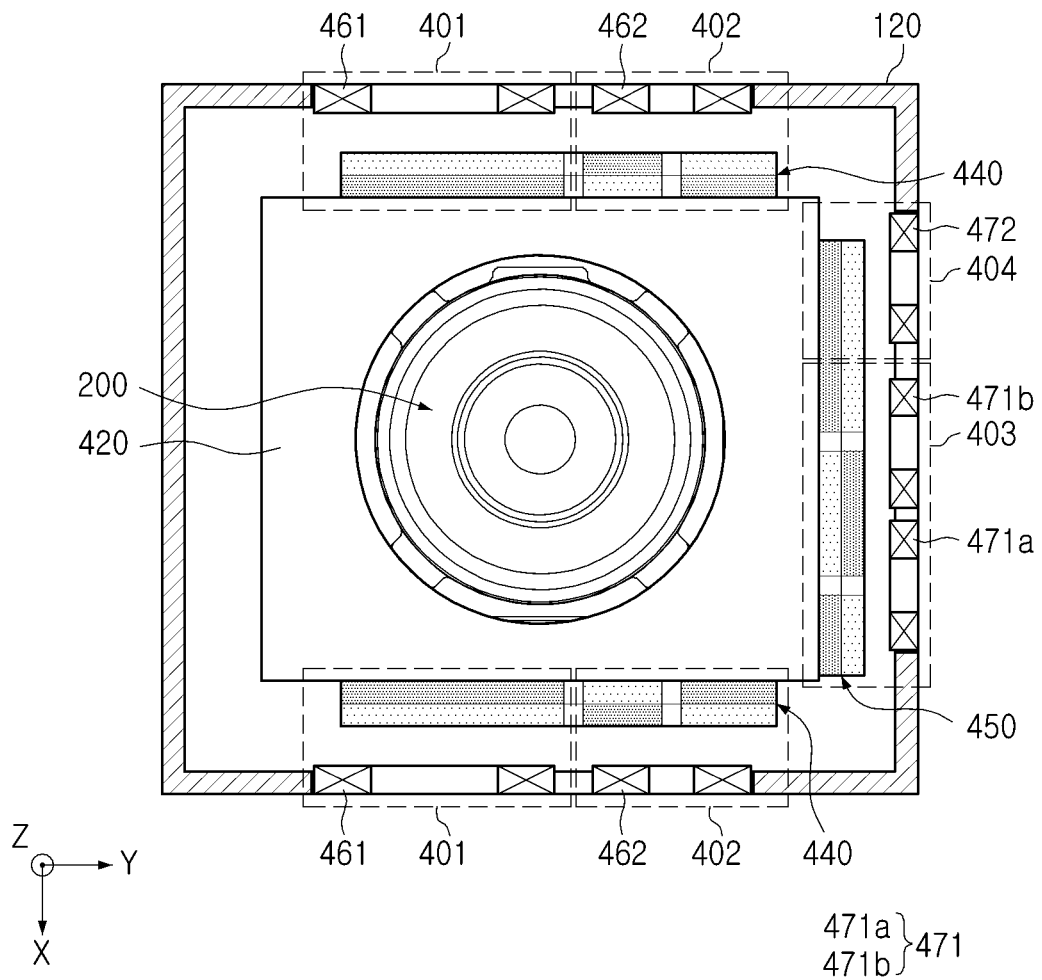
FIG. 12 shows an actuator for image stabilization in one or more still other example embodiments.
Figure 13:
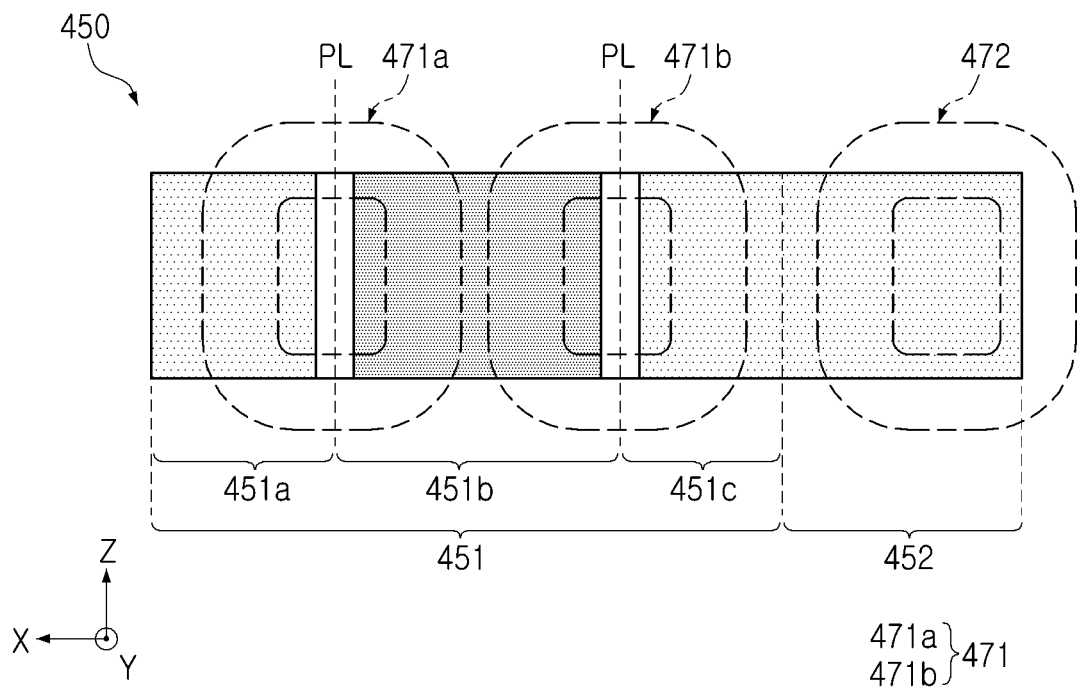
FIG. 13 is a side view of the actuator of FIG. 12.

FIG. 12 shows an actuator for image stabilization in one or more still other example embodiments; FIG. 13 is a side view of the actuator of FIG. 12; and FIG. 14 is a side view of the actuator of FIG. 12, in which a magnet is in a different form.

Figure 14:
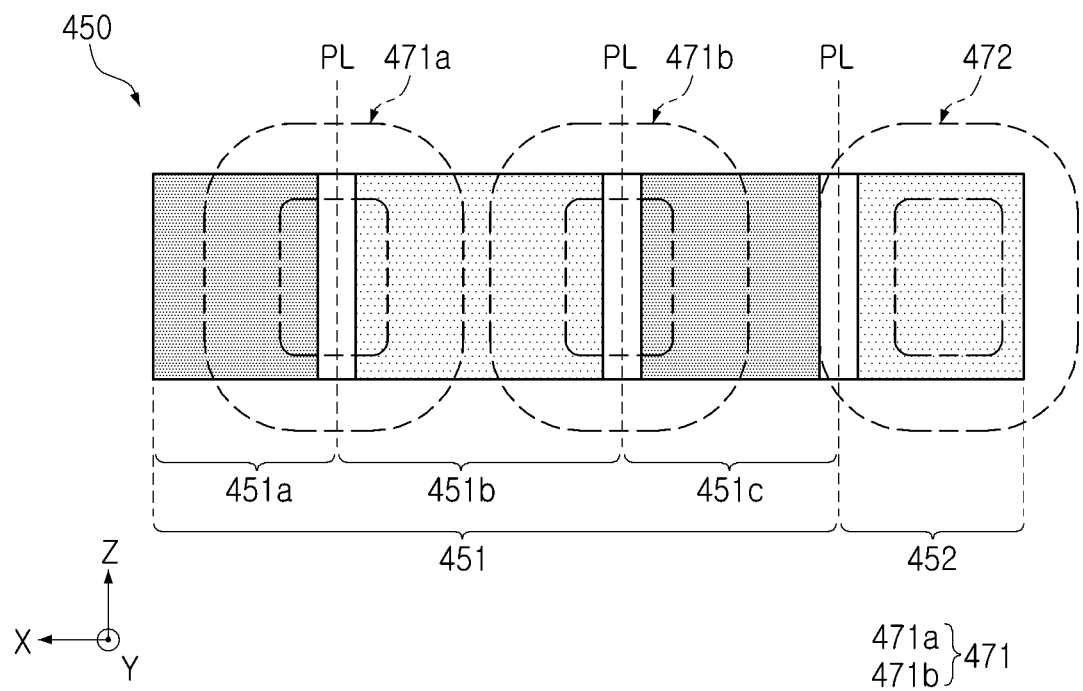
FIG. 14 is a side view of the actuator of FIG. 12, in which a magnet is in a different form.

Referring to FIGS. 12 through 14, in an example embodiment, the third coil 471 may include two coils 471a and 471b. The third coil 471 may be disposed in a direction parallel to a direction of a driving force generated by the third voice coil motor 403. For example, the third voice coil motor 403 may move the lens barrel 200 in the first direction (i.e., X direction), and the third coil 471 may include the two coils 471a and 471b arranged in the first direction.

In an example embodiment, the third magnet 451 may be polarized twice in the first direction to be divided into three portions 451a, 451b and 451c. For example, the third magnet 451 may include two polarization boundaries (PL). The polarization boundary (PL) may extend in the direction parallel to the optical axis (i.e., Z-axis) direction. The magnet may have different polarities, based on the polarization boundary (PL). For example, the first portion 451a and the third portion 451c may each have the N pole, and the second portion 451b may have the S pole.

In an example embodiment, the third magnet 451 may be disposed adjacent to the fourth magnet 452, or may be formed integrally with the fourth magnet 452. In an example embodiment, the fourth magnet 452 may be adjacent to or border the right portion (third portion) 451c of the third magnet 451. Here, the right portion 451c of the third magnet 451 and the fourth magnet 452 may have the same or different polarities. Referring to FIG. 13, the fourth magnet 452 may have the same polarity as that of the right portion 451c of the third magnet 451.

The magnet 450 of FIG. 12 may have a type shown in FIG. 13, and this type is only an example, and the magnet 450 may have a type shown in FIG. 14. Referring to FIG. 14, the fourth magnet 452 may have the different polarity from that of the right portion 451c of the third magnet 451.

FIG. 12 shows that the third voice coil motor 403 and the fourth voice coil motor 404 are both disposed on the right side of the lens holder 420, and this disposition is only an example, and in another example embodiment, one of the two components may be omitted.

Figure 15:
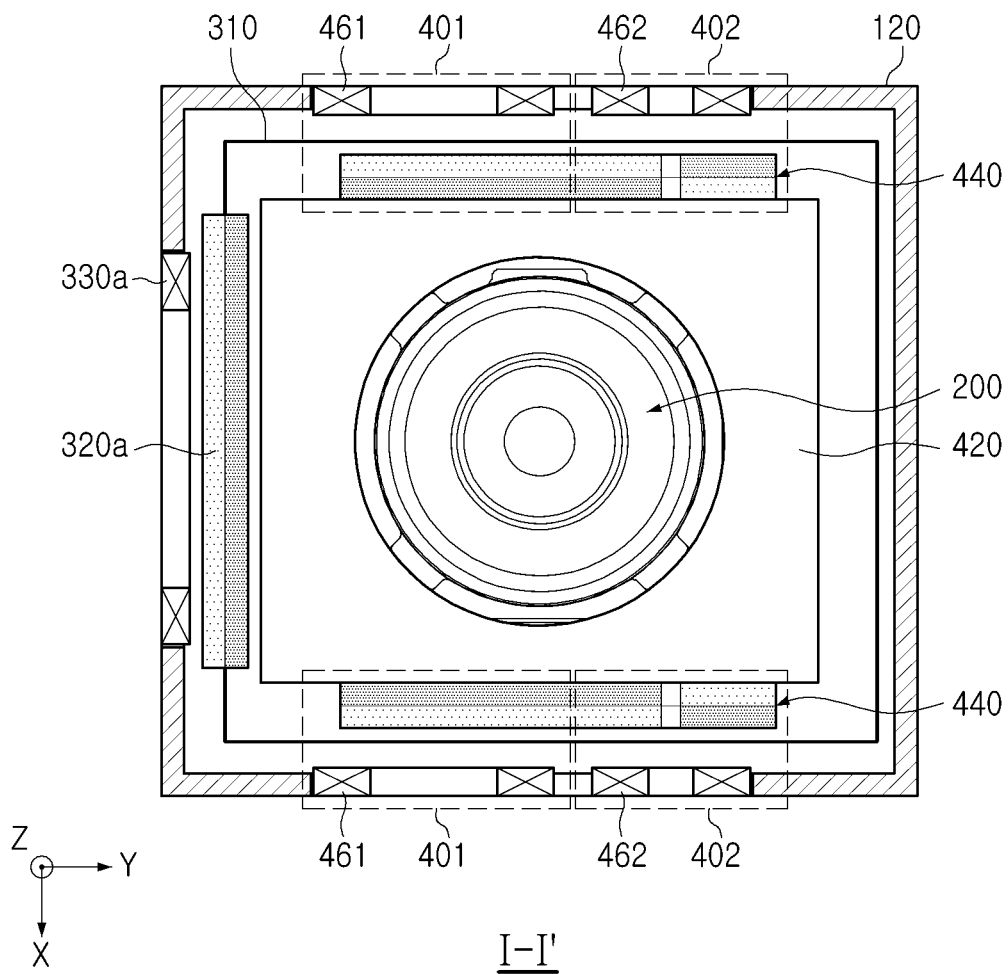
FIG. 15 shows a magnetic field of the camera module in one or more example embodiments.
Figure 16:
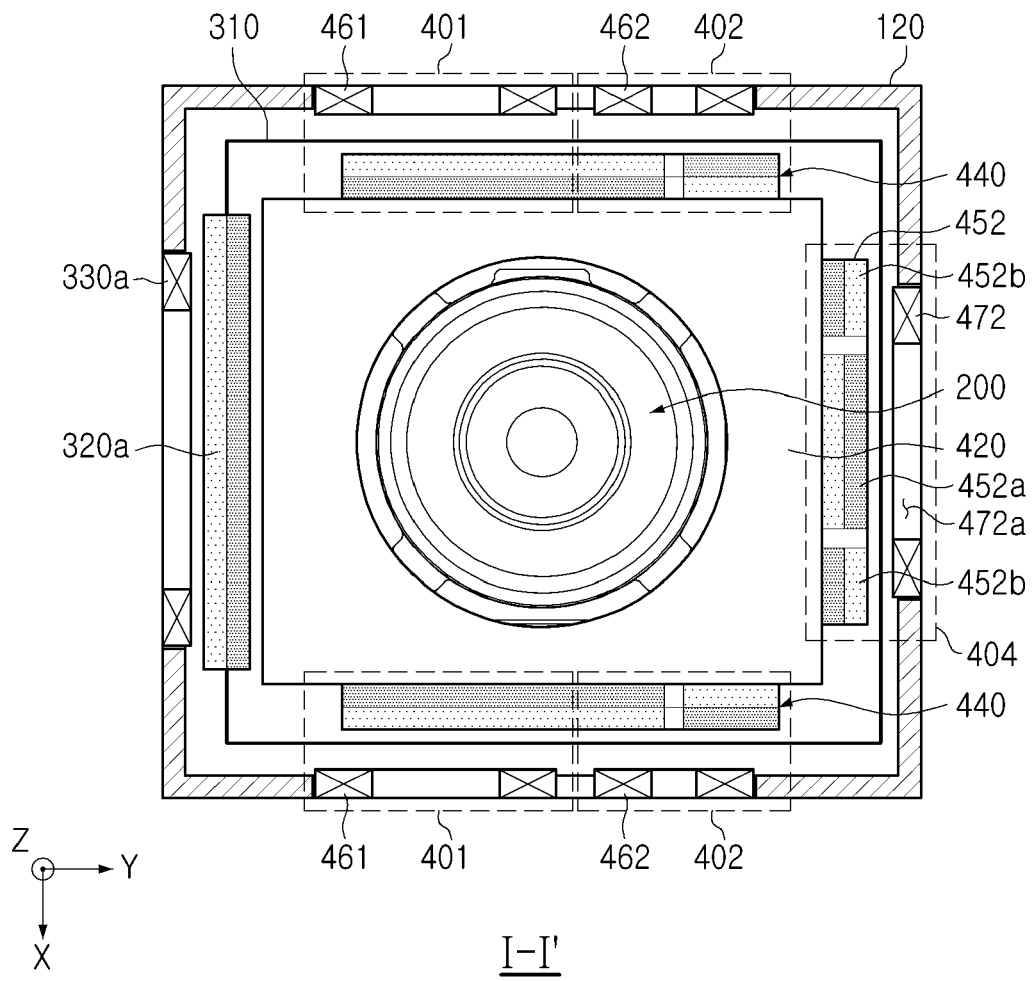
FIG. 16 shows a magnetic field of the camera module in one or more other example embodiments.

FIG. 15 shows a magnetic field of the camera module in one or more example embodiments. FIG. 16 shows a magnetic field of the camera module in one or more other example embodiments. FIGS. 15 and 16 are examples of the magnetic field including both the image stabilization driver and the autofocus driver.

Referring to FIG. 15, the camera module 100 may include the first voice coil motor 401 and the second voice coil motor 402, and descriptions thereof are the same as those described with reference to FIGS. 3 through 8.

Referring to FIG. 16, the camera module 100 may include the first voice coil motor 401, the second voice coil motor 402 and the fourth voice coil motor 404, and descriptions thereof are the same as those described with reference to FIGS. 9 through 14. However, in the example embodiment of FIG. 16, a center 452a of the fourth magnet 452 may have a polarity different from those of both ends 452b of the fourth magnet 452. The center 452a of the fourth magnet 452 may generally face an inner hole 472a of the fourth coil 472. When having a type shown in FIG. 16, the fourth magnet 452 may prevent leakage of the magnetic field, which may allow the magnetic field of the fourth magnet 452 to effectively act on the fourth coil 472. In addition, this feature may be similarly applied to some or all of the other drive magnets 320a, 441, 442, 451 and 452, described in the present disclosure.

Referring to FIGS. 15 and 16, the camera module 100 may include the carrier 310 accommodating the lens holder 420 and a magnetic field for autofocus, in which a driving force is generated to move the carrier 310 in the optical axis (Z-axis) direction. The magnet 320a for autofocus (AF) drive may be mounted on the carrier 310, and the coil 330a for AF drive may be disposed to face the magnet 320a for autofocus (AF) drive on the housing 120.

The combination of the actuators for implementing the OIS drive, shown in the drawings of the present disclosure are only examples, and the example embodiments of the present disclosure are not limited thereto. For example, the second voice coil motor 402 disposed on one side of the lens barrel 200 in the OIS driver may include one coil, as shown in FIG. 9, and may include two coils, as shown in FIG. 6.

For another example, the pair of first voice coil motors 401 disposed on both the sides of the lens barrel 200 may not be symmetrical to each other. For example, the first voice coil motor 401 disposed on the lens barrel 200 in the −X direction may have the type shown in FIG. 3, and the first voice coil motor 401 disposed in the +X direction may have the type shown in FIG. 6. Likewise, for example, the pair of second voice coil motors 402 disposed on both the sides of the lens barrel 200 may not be symmetrical to each other. For example, the second voice coil motor 402 disposed on the lens barrel 200 in the −X direction may have the type shown in FIG. 3, and the second voice coil motor 402 disposed in the +X direction may have the type shown in FIG. 6.

The example embodiments describe that the first voice coil motor 401 is disposed in the left side, and the second voice coil motor 402 is disposed in the right side. However, in another example embodiment, the positions of the first voice coil motor 401 and the second voice coil motors 402 in the Y direction may be switched to each other. In addition, the example embodiments describe that the third voice coil motor 403 is disposed in a lower side, and the fourth voice coil motor 404 is disposed in an upper side. However, in another example embodiment, the positions of the third voice coil motor 403 and the fourth voice coil motor 404 in the X direction may be switched to each other.

The example embodiments describe that the magnet 320a for AF drive is disposed in the carrier 310, and the coil 330a for AF drive is disposed in the housing 120, and this disposition is only an example. In another example embodiment, the magnet 320a for AF drive may be disposed in the housing 120, and the coil 330a for AF drive may be disposed in the carrier 310.

The example embodiments describe that the magnets 441, 442, 451 and 452 for OIS drive are provided on the lens holder 420, and the coils 461, 462, 471 and 472 for OIS drive are provided in the housing 120, and this disposition is only an example. In another example embodiment, the magnets 441, 442, 451 and 452 for OIS drive are provided in the housing 120, and the coils 461, 462, 471 and 472 for OIS drive are provided on the lens holder 420.

As set forth above, according to one or more example embodiments of the present disclosure, an actuator for the image stabilization included in the camera module may provide the sufficient driving force even when the lens barrel is moved to the greater degree, thus improving the image stabilization.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing;
   a lens module accommodated in the housing;
   a first optical image stabilization (OIS) driving unit configured to move the lens module, relative to the housing, in a first direction perpendicular to an optical axis direction; and
   a second OIS driving unit configured to move the lens module, relative to the housing, in a second direction perpendicular to the optical axis direction and intersecting the first direction,
   wherein the first OIS driving unit comprises first voice coil motors disposed on both sides of the lens module in the first direction, and the second OIS driving unit comprises second voice coil motors disposed on both sides of the lens module in the first direction.

2. The camera module of claim 1, wherein the first voice coil motor comprises a first magnet fixedly disposed on the lens module, and a first coil disposed in the housing and facing the first magnet in the first direction, and
   wherein the second voice coil motor comprises a second magnet fixedly disposed on the lens module, and a second coil disposed in the housing and facing the second magnet in the first direction.

3. The camera module of claim 2, wherein each of the first magnet and the second magnet is a portion of a single magnet.

4. The camera module of claim 2, wherein a surface of the first magnet, facing the first coil, has a single polarity and a surface of the second magnet, facing the second coil, is polarized in the second direction.

5. The camera module of claim 2, wherein the second coil comprises two coils arranged in the second direction.

6. The camera module of claim 1, wherein the first OIS driving unit further comprises a third voice coil motor disposed on one side of the lens module in the second direction, and
   wherein the second OIS driving unit further comprises a fourth voice coil motor disposed on one side of the lens module in the second direction.

7. The camera module of claim 6, wherein the third voice coil motor comprises a third magnet fixedly disposed on the lens module, and a third coil disposed in the housing and facing the third magnet in the second direction, and
   wherein the fourth voice coil motor comprises a fourth magnet fixedly disposed on the lens module, and a fourth coil disposed in the housing and facing the fourth magnet in the second direction.

8. The camera module of claim 7, wherein each of the third magnet and the fourth magnet is a portion of a single magnet.

9. The camera module of claim 7, wherein a surface of the third magnet, facing the third coil, is polarized in the first direction and a surface of the fourth magnet, facing the fourth coil, has a single polarity.

10. The camera module of claim 7, wherein the third coil comprises two coils arranged in the first direction.

11. The camera module of claim 1, further comprising a third OIS driving unit configured to move the lens module, relative to the housing in a third direction parallel to the optical axis direction,
    wherein the third OIS driving unit comprises a voice coil motor comprising a fifth magnet and a fifth coil facing each other in the second direction.

12. The camera module of claim 11, further comprising a carrier accommodating the lens module and disposed in the housing and configured to move in the third direction,
    wherein the fifth magnet is fixedly disposed in the carrier, and the fifth coil is fixedly disposed in the housing.

13. A camera module, comprising:
    a housing;
    a lens module accommodated in the housing; and
    a first optical image stabilization (OIS) driving unit configured to move the lens module, relative to the housing, in a first direction perpendicular to an optical axis direction,
    wherein the first OIS driving unit comprises a first voice coil motor disposed on one side of the lens module in the first direction, and a second voice coil motor disposed on one side of the lens module in a second direction perpendicular to the first direction, and
    wherein the first voice coil motor comprises a first magnet fixedly disposed on the lens module, and a first coil disposed in the housing and facing the first magnet in the first direction.

14. The camera module of claim 13,
    wherein the second voice coil motor comprises a second magnet fixedly disposed on the lens module, and a second coil disposed in the housing and facing the second magnet in the second direction.

15. The camera module of claim 14, wherein the first coil or the second coil comprises two coils arranged in the first direction.

16. The camera module of claim 14, wherein the first magnet or the second magnet is polarized in the first direction.

17. A camera module comprising:
    a lens barrel movable in a first direction perpendicular to an optical axis and a second direction perpendicular to the optical axis direction and intersecting the first direction;
    first direction driving units, disposed at opposite sides of the lens barrel in the first direction, and configured to urge the lens barrel in the first direction;

second direction driving units, disposed at the opposite sides of the lens barrel in the first direction, and configured to urge the lens barrel in the second direction.

18. The camera module of claim 17, wherein the first direction driving units and the second direction driving units comprise voice coil motors configured to perform optical image stabilization (OIS).

19. The camera module of claim 17, wherein the first direction driving units comprise first magnets fixedly disposed on the opposite sides of the lens module, and first coils disposed facing the first magnets in the first direction, and
wherein the second direction driving units comprise second magnets fixedly disposed on the opposite sides of the lens module, and second coils disposed facing the second magnets in the first direction.

20. The camera module of claim 19, wherein the first magnets and the second magnets are disposed in the second direction on each opposite side of the lens module, and
wherein the first coils and the second coils are disposed in the second direction opposing each opposite side of the lens module to face the first magnets and the second magnets, respectively.

* * * * *